US008840463B2

(12) United States Patent
Wright et al.

(10) Patent No.: US 8,840,463 B2
(45) Date of Patent: Sep. 23, 2014

(54) METHOD AND APPARATUS TO AWARD AT LEAST ONE JACKPOT PRIZE

(75) Inventors: Dean Wright, Emu Plains (AU); Stephen Cowan, Woronora Heights (AU)

(73) Assignee: Paltronics Australasia Pty Limited, Taron Point (AU)

( * ) Notice: Subject to any disclaimer, the term of this patent is extended or adjusted under 35 U.S.C. 154(b) by 95 days.

(21) Appl. No.: 13/045,062

(22) Filed: Mar. 10, 2011

(65) Prior Publication Data

US 2012/0009993 A1 Jan. 12, 2012

(30) Foreign Application Priority Data

Mar. 10, 2010 (AU) ................................ 2010900988

(51) Int. Cl.
*G06F 17/00* (2006.01)

(52) U.S. Cl.
USPC ............................................................ 463/26

(58) Field of Classification Search
USPC ..................................................... 463/16–26
See application file for complete search history.

(56) References Cited

U.S. PATENT DOCUMENTS

| | | | | |
|---|---|---|---|---|
| 5,564,700 | A | 10/1996 | Celona | |
| 6,210,275 | B1 | 4/2001 | Olsen | |
| 6,565,434 | B1 | 5/2003 | Acres | |
| 7,828,645 | B2 * | 11/2010 | Walker et al. | 463/25 |
| 7,867,078 | B2 | 1/2011 | Duhamel | |
| 7,997,974 | B2 | 8/2011 | Walker et al. | |
| 8,142,283 | B2 * | 3/2012 | Lutnick et al. | 463/29 |
| 2008/0026834 | A1 | 1/2008 | Yoshizawa | |
| 2008/0318656 | A1 | 12/2008 | Walker et al. | |
| 2011/0118000 | A1 * | 5/2011 | Jaffe et al. | 463/20 |

FOREIGN PATENT DOCUMENTS

| | | | |
|---|---|---|---|
| AU | 621599 | B2 | 3/1992 |
| AU | 10093/92 | A | 4/1993 |
| AU | 649512 | B2 | 5/1994 |
| AU | 716299 | B2 | 2/2000 |

(Continued)

OTHER PUBLICATIONS

U.S. Appl. No. 13/782,644, filed Mar. 1, 2013, 32 pages.

(Continued)

*Primary Examiner* — Ronald Laneau
(74) *Attorney, Agent, or Firm* — Garrett IP, L.L.C.

(57) ABSTRACT

An embodiment of the method commences with some initialization steps 10 and 11, which include defining parameters for first and second jackpots. A loop commences at steps 12 and 13 at which current values of the first and second jackpot prize pools are calculated. At step 14 the CPU 2 determines whether storage criterion has been met. If so, the process flow moves to steps 15, 16 and 17. If not, the process flow moves directly to step 18. At step 15 the current value of the second jackpot prize pool is stored as a "pending prize". Steps 16 and 17 effectively reset the second jackpot. At step 18 the CPU 2 determines whether the award criterion has been met. If not, the process flow loops back to step 12. If so, the first jackpot prize pool is awarded at step 19, along with one or more of any pending jackpot prizes, in accordance with a jackpot prize distribution scheme, then the pending jackpot prizes are deleted. At step 20 the award criterion is redefined and at step 21 the first jackpot prize pool is reset, before the process flow loops back to step 12.

23 Claims, 3 Drawing Sheets

(56) References Cited

FOREIGN PATENT DOCUMENTS

| | | | |
|---|---|---|---|
| AU | 199910969 | B2 | 8/2001 |
| AU | 2002367823 | B2 | 7/2006 |
| AU | 2007231793 | A1 | 5/2008 |
| WO | 94/19074 | A1 | 9/1994 |
| WO | 95/05876 | A1 | 3/1995 |
| WO | 96/24421 | A1 | 8/1996 |
| WO | 99/21630 | A1 | 5/1999 |
| WO | 2005/008514 | A1 | 1/2005 |
| WO | 2005/016471 | A1 | 2/2005 |
| WO | 2005/021117 | A2 | 3/2005 |
| WO | 2005029422 | A1 | 3/2005 |
| WO | 2005029423 | A1 | 3/2005 |
| WO | 2005/033825 | A2 | 4/2005 |

OTHER PUBLICATIONS

Examiner's First Report issued on Feb. 29, 2012 by Austrian Government, IP Australia, with respect to Australia Patent Application No. 2011/200979, 3 pages.

* cited by examiner

METHOD AND APPARATUS TO AWARD AT LEAST ONE JACKPOT PRIZE

FIELD OF THE INVENTION

The present invention relates to a method of awarding at least one jackpot prize. It also relates to associated apparatus such as controllers and gaming systems. Embodiments of the present invention find application, though not exclusively, in the gaming industry for use in the context of linked networks of electronic gaming machines, such as slot machines for example. Embodiments of the present invention are typically deployed in establishments that provide gaming facilities, such as casinos, pubs, clubs and the like.

BACKGROUND

It is known to link a number of electronic gaming machines to form a network. Such networks may be linked to a controller, such as a server, to provide a secondary game such as a jackpot game in which each of the linked electronic gaming machines may participate. This secondary game is typically provided in addition to the primary game of the electronic gaming machines, which may for example be slots, poker, blackjack, bingo, keno, or the like. The players of the linked electronic gaming machines each contribute to, and may win, a jackpot prize.

An example of a prior art arrangement in which more than one player may win any one jackpot is provided by granted Australian Patent No. 2002367823 in the name of IGT. As disclosed predominantly at pages 30 to 32, this prior art document discloses a system in which the jackpot is divided into a winner's jackpot and a distributed jackpot. Each player of an active gaming machine at the time of the triggering of the jackpot may share in the distributed jackpot.

Another prior art example of a jackpot arrangement is provided by pending Australian patent application no. 2007231793 in the name of IGT. In embodiments of this prior art arrangement the award triggering event may occur at a different time to the player triggering event. Information indicative of either the amount of the award, or the winning player, is stored until the other has been determined. This prior art arrangement allows for each player who contributes to the progressive award to be eligible to win that progressive award, even if that player is not playing one of the gaming machines in the gaming system.

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

SUMMARY

It is an object of the present invention to overcome, or substantially ameliorate, one or more of the disadvantages of the prior art, or to provide a useful alternative.

In one aspect of the present invention there is provided a method of awarding at least one jackpot prize, the method including:

- defining parameters for a first jackpot, said parameters including an award criterion;
- defining parameters for a second jackpot, said parameters including a storage criterion;
- accumulating a first jackpot prize pool in dependence upon a gaming activity of a plurality of electronic gaming machines;
- accumulating a second jackpot prize pool in dependence upon said gaming activity;
- storing the second jackpot prize pool as a pending jackpot prize, re-defining the second jackpot storage criterion and resetting the second jackpot prize pool in response to a satisfaction of the storage criterion; and
- awarding the first jackpot prize pool and one or more of any pending jackpot prizes to at least one recipient in accordance with a jackpot prize distribution scheme in response to a satisfaction of the award criterion.

Preferably the jackpot prize distribution scheme defines the recipient of the first jackpot prize pool as being a player of an electronic gaming machine that satisfied the award criterion.

Preferably the jackpot prize distribution scheme defines a set of potential recipients of the pending jackpot prizes as being the set of players of electronic gaming machines on which gaming activity occurred within a predefined time span associated with the satisfaction of the award criterion. Preferably said gaming activity is a contribution to the first jackpot prize pool and/or to the second jackpot prize pool. In one embodiment the recipient of the first jackpot prize pool is excluded from the set of potential recipients of the pending jackpot prizes.

Preferably the predefined time span is between one and six seconds.

In one embodiment the jackpot prize distribution scheme defines that the number of pending jackpot prizes that are available to be awarded cannot exceed the number of players in the set of potential recipients.

Preferably the recipients of the pending jackpot prizes are selected randomly or pseudo-randomly from amongst the set of potential recipients.

In an embodiment the defining parameters for the first jackpot includes defining the following parameters:

- a minimum first jackpot prize;
- a maximum first jackpot prize;
- a first increment percentage, which defines a percentage of the turnover of each of the electronic gaming machines that is contributed towards accumulation of the first jackpot prize pool;
- a first start up percentage, which defines a percentage of the turnover of each of the electronic gaming machines that is contributed towards the minimum first jackpot prize upon a reset of the first jackpot; and
- a first mystery value that falls within a range defined by the minimum first jackpot prize and the maximum first jackpot prize.

Preferably the defining of parameters for the second jackpot includes defining the following parameters:

- a minimum second jackpot prize;
- a maximum second jackpot prize;
- a second increment percentage, which defines a percentage of the turnover of each of the electronic gaming machines that is contributed towards accumulation of the second jackpot prize pool;
- a second start up percentage, which defines a percentage of the turnover of each of the electronic gaming machines that is contributed towards the minimum second jackpot prize upon a reset of the second jackpot; and
- a second mystery value that falls within a range defined by the minimum second jackpot prize and the maximum second jackpot prize.

Preferably the award criterion is defined as the first jackpot prize pool having a value equal to, or greater than, the first mystery value. Preferably the storage criterion is defined as the second jackpot prize pool having a value equal to, or greater than, the second mystery value.

In an embodiment the first jackpot parameters and the second jackpot parameters may be selected such that an expected second jackpot triggering rate exceeds an expected first jackpot triggering rate.

The method preferably includes the step of causing a display that is visible to players of the electronic gaming machines to display a current value of the first jackpot prize pool. Optionally the method may also include the step of causing the display to display the values of any pending jackpot prizes. For embodiments in which not all pending prizes are necessarily available to awarded, the method may include the step of causing the display to display the values of the pending jackpot prizes that are available to be awarded.

According to a second aspect of the invention there is provided a controller being programmed to perform a method as described above, said controller including:

a processor;

a memory operatively coupled to the processor; and communication means for communication with the plurality of electronic gaming machines.

According to a third aspect of the invention there is provided a gaming system including:

a plurality of electronic gaming machines; and a controller in communication with said plurality of gaming machines, the controller being programmed to conduct a first jackpot having an award criterion and a second jackpot having a storage criterion, whereby upon satisfaction of the storage criterion the controller stores a second jackpot prize pool as a pending jackpot prize and resets the second jackpot; and whereby upon satisfaction of the award criterion the controller awards the first jackpot prize pool and one or more of any pending jackpot prizes to at least one recipient in accordance with a jackpot prize distribution scheme.

According to a fourth aspect of the invention there is provided a computer-readable medium containing computer executable code for instructing a computer to perform the method as described above.

According to a fifth aspect of the invention there is provided at least one downloadable or remotely executable file containing computer executable code for instructing a computer to perform a method as described above.

According to another aspect of the invention there is provided a method of awarding at least one jackpot prize, the method including:

defining parameters for a jackpot, said parameters including a storage criterion;

defining an award criterion for the jackpot;

accumulating a jackpot prize pool in dependence upon a gaming activity of a plurality of electronic gaming machines;

storing the jackpot prize pool as a pending jackpot prize, re-defining the jackpot storage criterion and resetting the jackpot prize pool in response to a satisfaction of the storage criterion; and awarding at least one of the pending jackpot prizes to at least one recipient in accordance with a jackpot prize distribution scheme in response to a satisfaction of the award criterion.

In one embodiment the award criterion is defined as the receipt of a signal from one of said electronic gaming machines, said signal being indicative of, or associated with, a request for the award of a pending jackpot.

In another embodiment the award criterion is defined with reference to a statistic associated with a player tracking system.

The features and advantages of the present invention will become further apparent from the following detailed description of preferred embodiments, provided by way of example only, together with the accompanying drawings.

BRIEF DESCRIPTION OF THE DRAWINGS/FIGURES

DETAILED DESCRIPTION

At least some embodiments of the invention make use of certain elements of hardware and software similar to that disclosed in Patent Application No. PCT/AU2004/000964, the disclosure of which is incorporated herein by way of reference.

Figure 1:
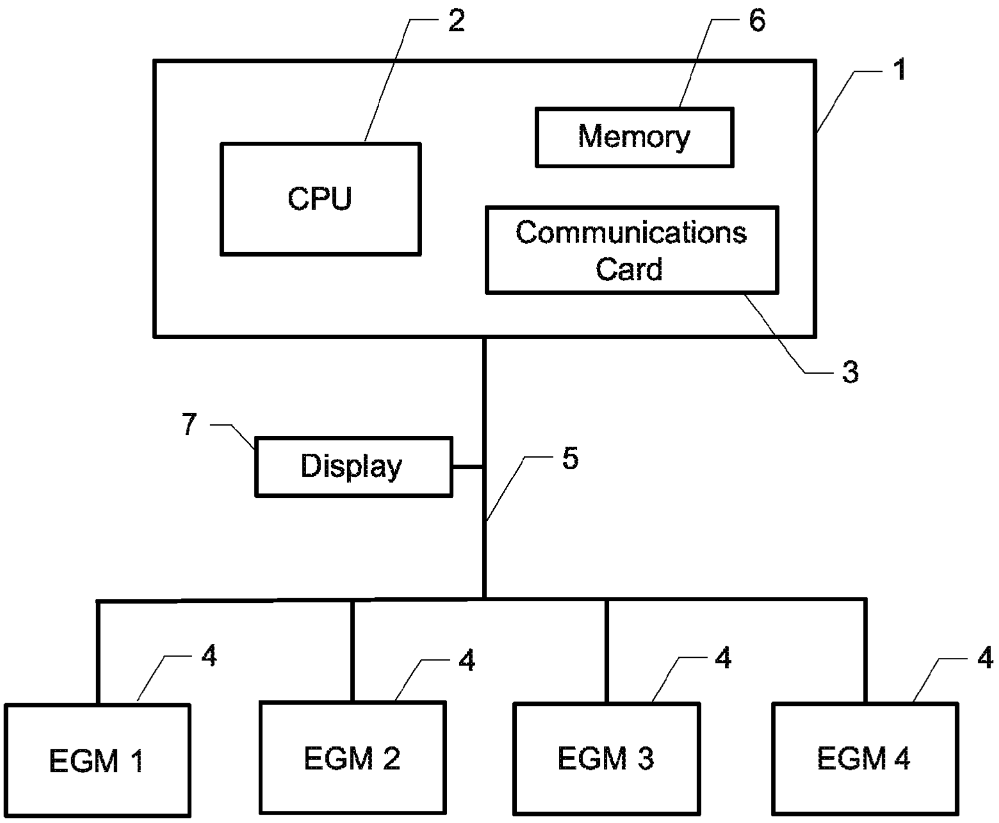
FIG. 1 is a schematic representation of an embodiment of the present invention.

Referring to FIG. 1, the controller 1 has a central processing unit (CPU) 2 and a communications card 3 that is operatively coupled to the CPU 2 and which communicatively links the controller 1 to a plurality of electronic gaming machines (EGM's) 4. In some embodiments the communications link 5 is provided by cables, a wireless link, a local area network, a wide area network, or a combination thereof. The EGM's 4 may be located within a single establishment, or may be located in two or more geographically dispersed locations. Also operatively coupled to the CPU 2 is memory 6, which is typically in the form of random access memory or other readable and writable digital storage media such as hard drives, flash drives, and the like.

In some embodiments the CPU 2 is programmed to perform the inventive method by means of computer executable code stored on a computer readable medium, such as a CD-ROM, for example. In other embodiments the executable code is accessed either by means of downloading a file from a remote location, for example via the internet, or by means of remote execution, such as in a so-called "cloud computing" context.

Figure 3:
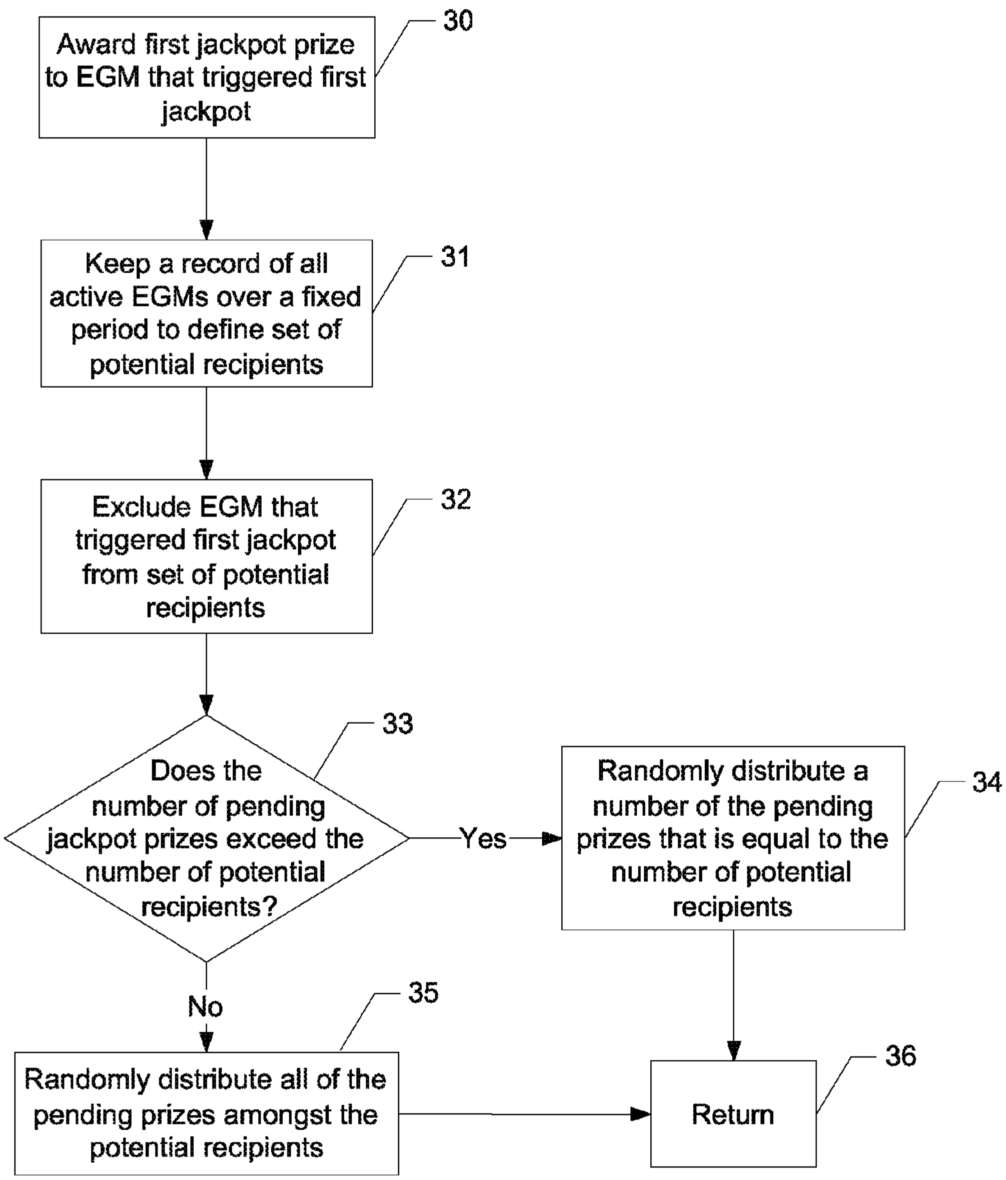
FIG. 3 is a flowchart showing features performed in a jackpot prize distribution scheme of an embodiment of the inventive method.

As will be described in greater detail below, the controller 1 is programmed to conduct a first jackpot that has an award criterion and a second jackpot that has a storage criterion. The CPU 2 maintains variables that represent first and second jackpot prize pools, which are progressively accumulated based upon gaming activity as communicated by the EGM's 4 to the controller 1. The progressive accumulation of the first and second jackpot pools eventually satisfies either or both of the award criterion and the storage criterion. Each time the storage criterion is satisfied the controller 1 stores the current value of the second jackpot prize pool in memory 6. This value is typically an amount of currency that may be expressed in dollars and cents and, once stored in this fashion, is referred to as a "pending jackpot prize". At this point the pending jackpot prize has not been allocated to any particular player, but rather is simply allocated to the controller 1. The CPU 2 then resets the second jackpot and continues with the progressive accumulation of the first and second jackpot pools. Upon satisfaction of the award criterion the controller 1 awards the first jackpot prize pool, along with one or more of any pending jackpot prizes, to at least one recipient in accordance with a jackpot prize distribution scheme. An example of such a jackpot prize distribution scheme is shown in FIG. 3 and is described in greater detail below.

The CPU 2 has access to display driver software that is executable to cause the display 7 to display various messages to the players of the EGM's 4. In some embodiments the CPU is programmed to cause the display 7 to display the current values of the first jackpot prize pool and/or the values of any pending jackpot prizes.

Figure 2:
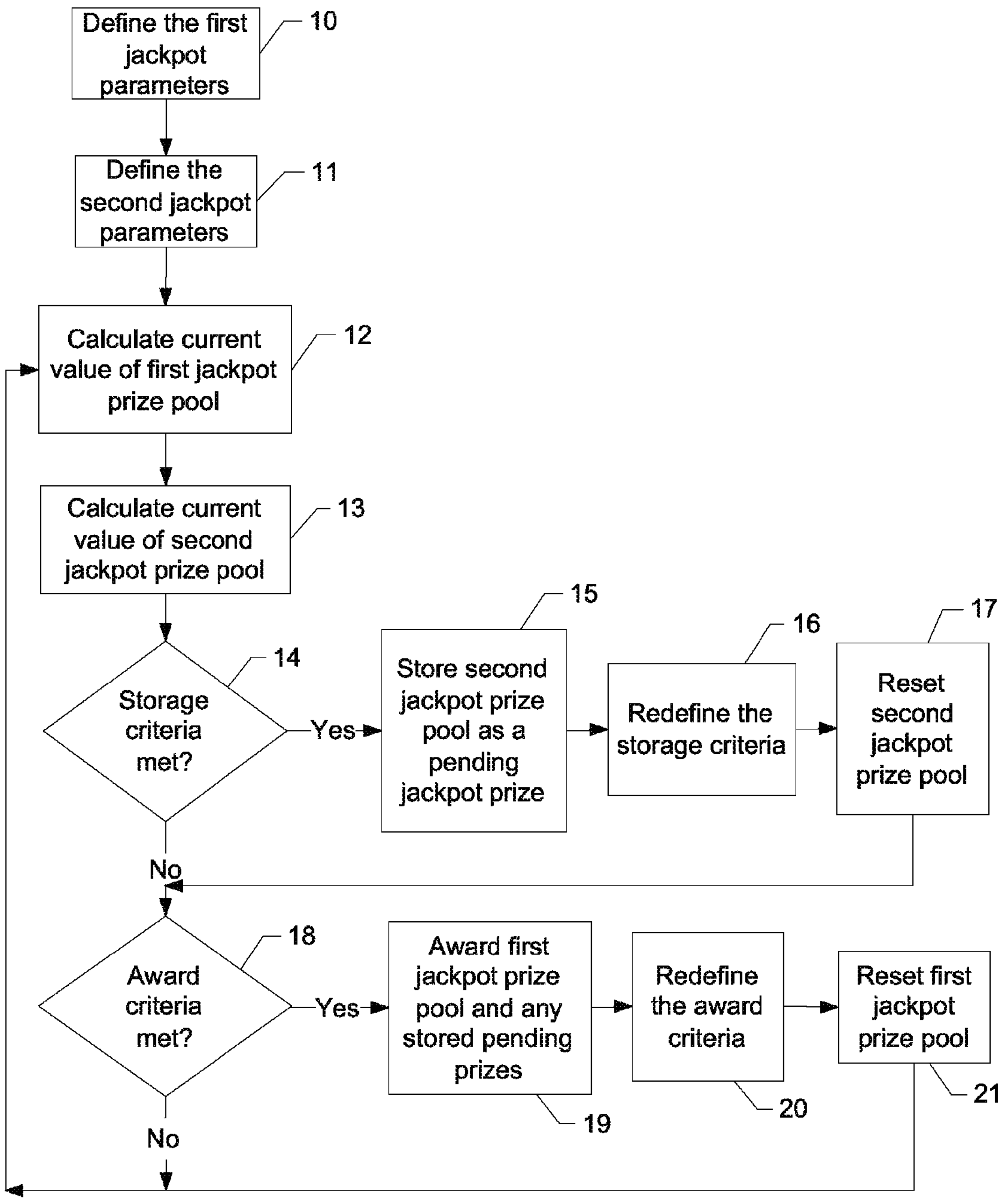
FIG. 2 is a flowchart of a method showing features performed in an embodiment of the inventive method.

With reference to FIG. 2, the method commences with some initialization steps 10 and 11, which include defining the parameters for the first and second jackpots respectively. In an exemplary implementation of an embodiment of the invention this includes the following:

| First Jackpot | |
|---|---|
| Minimum First Jackpot Prize = | $100.00 |
| Maximum First Jackpot Prize = | $200.00 |
| First Jackpot Increment % = | 0.5% |
| First Jackpot Startout % = | 1.0% |
| First Jackpot Mystery Value = | A randomly or pseudo-randomly defined value within the range defined by the Minimum First Jackpot Value and the Maximum First Jackpot Value. |

| Second Jackpot | |
|---|---|
| Minimum Second Jackpot Prize = | $10.00 |
| Maximum Second Jackpot Prize = | $20.00 |
| Second Jackpot Increment % = | 0.25% |
| Second Jackpot Startout % = | 0.5% |
| Second Jackpot Mystery Value = | A randomly or pseudo-randomly defined value within the range defined by the Minimum Second Jackpot Value and the Maximum Second Jackpot Value. |

The first jackpot mystery value defines the award criterion in so far as the award of jackpot prizes takes place once the first jackpot prize pool has been progressively incremented so as to equal, or exceed, the first jackpot mystery value. Similarly, the second jackpot mystery value defines the storage criterion because the second jackpot prize pool is stored as a pending jackpot prize once the second jackpot prize pool has been progressively incremented so as to equal, or exceed, the second jackpot mystery value.

These first and second jackpot parameters are selected such that an expected second jackpot triggering rate (i.e. the rate at which the award criterion is satisfied) exceeds an expected first jackpot triggering rate (i.e. the rate at which the storage criterion is satisfied). More particularly, the average statistical expectation based upon these parameters is that approximately five pending jackpots would be stored for each time that the award criterion is met.

It will be appreciated by those skilled in the art that the Return-To-Player percentages (RTP %) of the first and second jackpots are given by an addition of the relevant increment and startout percentages. Hence, for the first jackpot in the exemplary implementation, the RTP %=1.5% and for the second jackpot in the exemplary implementation, the RTP %=0.75%.

The process flow then proceeds into a loop which commences at step 12 at which a current value of the first jackpot prize pool is calculated by the CPU 2. This calculation takes place in a known manner whereby the previous value of the first jackpot prize pool is incremented by the first jackpot increment percentage multiplied by the turnover of the various linked EGM's 4 that has been communicated by the EGM's 4 to the controller 1 since the last such calculation was made.

At step 13 the CPU performs a similar calculation to determine the current value of the second jackpot prize pool. The previous value of the second jackpot prize pool is incremented by the second jackpot increment percentage multiplied by the turnover of the various linked EGM's that has been communicated by the EGM's to the controller 1 since the last such calculation was made.

The process flow then proceeds to step 14 at which the CPU 2 determines whether the storage criterion has been met by checking whether the second jackpot prize pool has a value equal to, or greater than, the second mystery value. If so, the process flow moves to steps 15, 16 and 17. If not, the process flow moves directly to step 18.

At step 15 the current value of the second jackpot prize pool is stored in a memory address of the memory 6 as a "pending prize". If the storage criterion is satisfied a number of times before the award criterion is satisfied, this will result in a number of pending prizes being stored concurrently at separate memory addresses of the memory 6.

Steps 16 and 17 effectively reset the second jackpot. At step 16 the storage criterion is redefined by the random or pseudo-random determination of a new second mystery value. At step 17 the second jackpot prize pool is reset to the minimum second jackpot prize, which in the exemplary implementation is $10.00. After step 17 the process flow moves to step 18.

At step 18 the CPU 2 determines whether the award criterion has been met by ascertaining whether the current value of the first jackpot prize pool is equal to, or greater than, the first jackpot mystery value. If so, the CPU stores in memory 6 an EGM identifier record that is indicative of the specific EGM 4 that made the contribution that caused the first jackpot mystery value to increment to a value equal to, or greater than, the first jackpot mystery value and then the process flow moves to step 19. If the award criterion has not been met then the process flow loops back to step 12.

At step 19 the CPU 2 executes a routine that results in the award of the first jackpot prize pool, along with one or more of any pending jackpot prizes, to the players in accordance with a jackpot prize distribution scheme. More particularly, the CPU 2 awards the first jackpot prize pool to the EGM that was recorded at step 18. It also awards one or more of any pending jackpot prizes to some of the players in a manner outlined in more detail below with regard to FIG. 3. Once awarded, the pending jackpot prizes are deleted from the memory 6.

After the award of the prizes, the process flow moves to step 20, at which the award criterion is redefined by randomly or pseudo-randomly determining a new value for the first jackpot mystery value. At step 21 the first jackpot prize pool is reset to the minimum first jackpot prize value, which in the exemplary implementation is $100. Having reset the first jackpot, the process flow loops back to step 12.

The processing that takes place at step 19 during the processing of the jackpot prize distribution scheme is shown in more detail in FIG. 3. Once the CPU 2 has ascertained that the award criterion has been satisfied, it awards the first jackpot prize pool to the player of the EGM 4 that made the contribution that satisfied the award criterion. In other words, the first jackpot prize pool is awarded to the player of the EGM 4 that triggered the first jackpot. This is shown as step 30 in FIG. 3. The CPU 2 then proceeds to step 31, at which it monitors and records all of the active EGM's 4 for a fixed period, which in the exemplary embodiment is 3.5 seconds from the triggering of the first jackpot prize. Hence, for this 3.5 second period, the CPU stores a record in its memory 6 of the EGM identifiers that are associated with each EGM that communicates to the controller 1 that it has made a contribution to the first and second jackpot pools. This commences the definition of the set of potential recipients of the pending prizes.

Once the 3.5 seconds have elapsed the CPU executes a routine that removes any double-entries from the list of potential recipients, so that each potential recipient is listed once only on the record of potential recipients that is kept in the memory 6. However, it will be appreciated that this routine may be dispensed with for implementations in which such doubling-up is allowable.

The process flow then moves to step 32, at which if necessary the EGM identifier of the EGM that triggered the first jackpot is removed from the set of potential recipients of the pending prizes. In other words, the player of the EGM that was awarded the first jackpot prize is excluded from the possibility of also winning any of the pending prizes. However, it will be appreciated that other embodiments of the invention may be configured to allow this possibility simply by removing step 32 from the process flow.

The process flow now moves to step 33, at which the CPU 2 compares the number of pending jackpot prizes that are stored in the memory 6 to the number of potential recipients in the record. This comparison is carried out because the jackpot prize distribution scheme of the illustrated embodiment defines that the number of pending jackpot prizes that are available to be awarded cannot exceed the number of players in the set of potential recipients. If the number of pending jackpot prizes exceeds the number of potential recipients, then the process flow moves to step 34; whereas if not the process flow moves to step 35.

At step 34 the CPU awards a number of pending prizes that is equal to the number of potential recipients. Hence, by way of example, if at step 34 there are eight pending prizes and only five potential recipients, then only five of the pending prizes are available to be awarded. The remaining three pending prizes continue to be stored and may be awarded to players upon a subsequent satisfaction of the award criterion. For this embodiment the CPU 2 is configured to drive the display 7 such that only the values of the pending prizes that are available to be awarded are displayed to the players. Hence, in the example above, the values of only five of the pending prizes would be displayed, despite eight pending prizes being stored, because there are only five potential recipients and therefore only five pending prizes that are available to be awarded.

In some embodiments the five pending prizes may be respectively distributed to each of the five potential recipients. However, in the illustrated embodiment the five pending prizes are randomly or pseudo-randomly distributed amongst the five potential recipients such that it is possible for some of the potential recipients to receive more than one pending prize, whilst others may receive none. Once the pending prizes have been distributed at step 34, the process flow moves to step 36, at which the process flow returns to step 20 of FIG. 2.

At step 35 the CPU distributes the pending prizes in a context in which the number of pending jackpot prizes does not exceed the number of potential recipients. This entails a random or pseudo-random distribution of the pending prizes amongst the potential recipients. By way of example, for a situation in which there are three pending prizes and ten potential recipients, the CPU randomly or pseudo-randomly selects three of the ten potential recipients and awards one of the three pending prizes to each of them. Once the pending prizes have been distributed at step 35, the process flow moves to step 36, at which the process flow returns to step 20 of FIG. 2.

Alternative embodiments of the invention dispense with steps 33 and 34 and simply randomly or pseudo-randomly distribute all of the pending prizes amongst the potential recipients, irrespective of whether there may be more pending prizes than potential recipients.

It will be appreciated that embodiments of the invention advantageously allow the entity deploying the system to select from amongst a range of pre-approved sets of parameters. This allows for a selection of the desired average performance of the first and second jackpots from that provided by the available sets of parameters. For example, an alternative embodiment of the invention utilizes parameters that give rise to a statistical expectation that the prizes awarded by the second jackpot will be on average larger and less frequent as compared to those awarded by the first jackpot. Two such sets of parameters are as follows:

| First Jackpot | |
|---|---|
| Minimum First Jackpot Prize = | $100.00 |
| Maximum First Jackpot Prize = | $200.00 |
| First Jackpot Increment % = | 0.5% |
| First Jackpot Startout % = | 1.0% |
| First Jackpot Mystery Value = | A randomly or pseudo-randomly defined value within the range defined by the Minimum First Jackpot Value and the Maximum First Jackpot Value. |

| Second Jackpot | |
|---|---|
| Minimum Second Jackpot Prize = | $1000.00 |
| Maximum Second Jackpot Prize = | $2000.00 |
| Second Jackpot Increment % = | 0.75% |
| Second Jackpot Startout % = | 1.5% |
| Second Jackpot Mystery Value = | A randomly or pseudo-randomly defined value within the range defined by the Minimum Second Jackpot Value and the Maximum Second Jackpot Value. |

Using these parameters, the first jackpot RTP %=1.5% and the second jackpot RTP %=2.25%.

During the operation of the embodiment that utilizes the above parameters, it is likely that the first jackpot will be awarded a number of times without any pending jackpots having been stored. However, once the second jackpot reaches its storage criterion (i.e. once the second jackpot prize pool equals or exceeds the second jackpot mystery value) the second jackpot is stored as a pending jackpot, which is subsequently awarded to a player when the next first jackpot is triggered.

In each of the above described embodiments the triggering of the award of one or more of the pending jackpots has been dependent upon the triggering of the award of the first jackpot. However, in other embodiments alternative criteria may be used to trigger the award of one or more of the pending jackpots.

One such embodiment runs only a single jackpot at any one point in time (as opposed to the first and second jackpots that are run concurrently in the embodiments described above). The method employed by this embodiment commences with the defining of parameters for the jackpot. These parameters include a storage criterion, which is defined with reference to a jackpot mystery value. Hence, the jackpot prize pool progressively accumulates and is eventually stored as a pending jackpot when the storage criterion is satisfied (which occurs when the jackpot prize pool is incremented so as to equal, or exceed, the jackpot mystery value). Once the pending jackpot has been stored, the jackpot is reset and the accumulation of the jackpot prize pool re-commences. An award criterion is also defined for the jackpot, which in one embodiment is the receipt by the controller 1 of a signal from one of the EGM's 4 whereby the signal is indicative of, or associated with, a request for the award of a pending jackpot. In this embodiment the EGM's 4 are programmed to generate such a signal whenever a game being played on the EGM results in a pre-defined combination of bonus symbols.

Another embodiment makes use of known player tracking systems that are capable of keeping track of a number of statistics associated with at least some of the players. In one such embodiment the award criterion is dependent on a statistic that is associated with the number of games played by a player over a given time period. If this number exceeds a pre-determined threshold, the player tracking system communicates a request for the award of a pending jackpot to the controller 1. In either of these embodiments, once the award criterion is met at least one of the pending jackpot prizes is awarded to at least one recipient in accordance with a jackpot prize distribution scheme.

Advantageously, some embodiments of the invention may be implemented in a manner that makes effective use of existing linked jackpot systems and processes. Typically only minimal changes are required to reconfigure such existing systems to perform in accordance with the embodiment of the invention. Additionally, many embodiments of the invention require only minimal changes to existing reconciliation and reporting functions that may already be in place in the venues that provide existing linked jackpot systems. Another advantage associated with some embodiments of the invention is a simplification of the selection of the jackpot parameters.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

What is claimed is:

1. A processor-implemented method of awarding at least one jackpot prize, including:

- defining processor-accessible parameters for a first jackpot, said parameters including an award criterion;
- defining processor-accessible parameters for a second jackpot, said parameters including a storage criterion;
- using the processor to accumulate a first jackpot prize pool in dependence upon a gaming activity of a plurality of electronic gaming machines;
- using the processor to accumulate a second jackpot prize pool in dependence upon said gaming activity;
- using the processor to store the second jackpot prize pool as a pending jackpot prize, re-define the second jackpot storage criterion and reset the second jackpot prize pool in response to a satisfaction of the storage criterion; and
- using the processor to award the first jackpot prize pool and one or more of any pending jackpot prizes to at least one recipient in accordance with a jackpot prize distribution scheme in response to a satisfaction of the award criterion.

2. The method according claim 1 wherein the jackpot prize distribution scheme defines the recipient of the first jackpot prize pool as being a player of an electronic gaming machine that satisfied the award criterion.

3. The method according to claim 2 wherein the jackpot prize distribution scheme defines a set of potential recipients of the pending jackpot prizes as being the set of players of electronic gaming machines on which gaming activity occurred within a predefined time span associated with the satisfaction of the award criterion.

4. The method according to claim 3 wherein the recipient of the first jackpot prize pool is excluded from the set of potential recipients of the pending jackpot prizes.

5. The method according to claim 3 wherein the predefined time span is between one and six seconds.

6. The method according to claim 3 wherein said gaming activity is a contribution to the first jackpot prize pool and/or to the second jackpot prize pool.

7. The method according to claim 3 wherein the jackpot prize distribution scheme defines that the number of pending jackpot prizes that are available to be awarded cannot exceed the number of players in the set of potential recipients.

8. The method according to claim 7 further including causing a display that is visible to players of the electronic gaming machines to display the values of the pending jackpot prizes that are available to be awarded.

9. The method according to claim 3 wherein recipients of the pending jackpot prizes are selected randomly or pseudo-randomly from amongst the set of potential recipients.

10. The method according to claim 1 wherein the defining parameters for the first jackpot includes defining the following parameters:

- a minimum first jackpot prize;
- a maximum first jackpot prize;
- a first increment percentage, which defines a percentage of the turnover of each of the electronic gaming machines that is contributed towards accumulation of the first jackpot prize pool;
- a first start up percentage, which defines a percentage of the turnover of each of the electronic gaming machines that is contributed towards the minimum first jackpot prize upon a reset of the first jackpot; and
- a first mystery value that falls within a range defined by the minimum first jackpot prize and the maximum first jackpot prize.

11. The method according to claim 10 wherein the award criterion is defined as the first jackpot prize pool having a value equal to, or greater than, the first mystery value.

12. The method according to claim 10 wherein the storage criterion is defined as the second jackpot prize pool having a value equal to, or greater than, the second mystery value.

13. The method according to claim 1 wherein the defining parameters for the second jackpot includes defining the following parameters:

- a minimum second jackpot prize;
- a maximum second jackpot prize;
- a second increment percentage, which defines a percentage of the turnover of each of the electronic gaming machines that is contributed towards accumulation of the second jackpot prize pool;
- a second start up percentage, which defines a percentage of the turnover of each of the electronic gaming machines that is contributed towards the minimum second jackpot prize upon a reset of the second jackpot; and a second mystery value that falls within a range defined by the minimum second jackpot prize and the maximum second jackpot prize.

14. The method according to claim 1 wherein the first jackpot parameters and the second jackpot parameters are selected such that an expected second jackpot triggering rate exceeds an expected first jackpot triggering rate.

15. The method according to claim 1 further including causing a display that is visible to players of the electronic gaming machines to display a current value of the first jackpot prize pool.

16. The method according to claim 15 further including causing the display to display the values of the pending jackpot prizes.

17. A controller programmed to perform a method according to any one of the preceding claims, said controller including:

a processor;

a memory operatively coupled to the processor;

a non-transitory computer readable medium encoded with a computer program, including instructions to cause the processor to perform the method; and communication means for communication with the plurality of electronic gaming machines.

18. A gaming system including:

a plurality of electronic gaming machines; and a controller in communication with said plurality of gaming machines and programmed to conduct a first jackpot having an award criterion and a second jackpot having a storage criterion, whereby upon satisfaction of the storage criterion the controller stores a second jackpot prize pool as a pending jackpot prize and resets the second jackpot; and whereby upon satisfaction of the award criterion the controller awards the first jackpot prize pool and one or more of any pending jackpot prizes to at least one recipient in accordance with a jackpot prize distribution scheme.

19. A non-transitory computer-readable medium to store computer executable code to cause a computer system to perform the method according to claim 1.

20. At least one downloadable or remotely executable file containing computer executable code stored in a non-transitory computer readable media for instructing a computer to perform a method according to claim 1.

21. A processor-implemented method of awarding at least one jackpot prize, including:

defining processor-accessible parameters for a jackpot, said parameters including a storage criterion;

defining a processor-accessible award criterion for the jackpot;

using the processor to accumulate a jackpot prize pool in dependence upon a gaming activity of a plurality of electronic gaming machines;

using the processor to store the jackpot prize pool as a pending jackpot prize, re-define the jackpot storage criterion and reset the jackpot prize pool in response to a satisfaction of the storage criterion; and using the processor to award at least one of the pending jackpot prizes to at least one recipient in accordance with a jackpot prize distribution scheme in response to a satisfaction of the award criterion.

22. The method according to claim 21 wherein the award criterion is defined as the receipt of a signal from one of said electronic gaming machines, said signal being indicative of, or associated with, a request for the award of a pending jackpot.

23. The method according to claim 21 wherein the award criterion is defined with reference to a statistic associated with a player tracking system.

* * * * *